US012675179B1

(12) United States Patent
Chawda et al.

(10) Patent No.: US 12,675,179 B1
(45) Date of Patent: Jul. 7, 2026

(54) TOUCH INTERACTION DETECTION

(71) Applicant: Apple Inc., Cupertino, CA (US)

(72) Inventors: Vinay Chawda, Santa Clara, CA (US);
Ashwin Kumar Asoka Kumar Shenoi,
San Jose, CA (US)

(73) Assignee: Apple Inc., Cupertino, CA (US)

( * ) Notice: Subject to any disclaimer, the term of this
patent is extended or adjusted under 35
U.S.C. 154(b) by 6 days.

(21) Appl. No.: 17/667,741

(22) Filed: Feb. 9, 2022

Related U.S. Application Data

(60) Provisional application No. 63/147,789, filed on Feb.
10, 2021.

(51) Int. Cl.
G06F 3/041 (2006.01)
(52) U.S. Cl.
CPC .................................... G06F 3/041 (2013.01)
(58) Field of Classification Search
CPC ............. G06F 3/041; G06F 2203/0331; G06F
2203/0335; G06F 3/014
See application file for complete search history.

(56) References Cited

U.S. PATENT DOCUMENTS

| | | | |
|---|---|---|---|
| 10,318,071 B2 | 6/2019 | Suzuki et al. | |
| 10,642,356 B1 | 5/2020 | Wang et al. | |
| 10,795,438 B2 | 10/2020 | Wang | |
| 10,838,499 B2 | 11/2020 | Wang et al. | |
| 11,755,107 B1 * | 9/2023 | Cihan ..................... | G06F 3/017 |
| | | | 345/156 |

| | | | |
|---|---|---|---|
| 2009/0278798 A1 * | 11/2009 | Kim ........................ | G06F 3/017 |
| | | | 345/158 |
| 2010/0259472 A1 * | 10/2010 | Radivojevic ............ | G06F 3/016 |
| | | | 345/156 |
| 2014/0002114 A1 * | 1/2014 | Schwartz .............. | G06F 3/0446 |
| | | | 324/679 |

(Continued)

OTHER PUBLICATIONS

Sharifi-Janabi, Farrokh, Hayward, Vincent and Chen, Chung-Shin
J.; "Discrete-Time Adaptive Windowing for Velocity Estimation",
IEEE Transactions on Control Systems Technology, vol. 8, No. 6,
Nov. 2000, pp. 1003-1009.

(Continued)

*Primary Examiner* — Temesghen Ghebretinsae
*Assistant Examiner* — Sosina Abebe
(74) *Attorney, Agent, or Firm* — Thompson Hine LLP

(57) ABSTRACT

Various implementations disclosed herein facilitate identify
touch interactions based on sensor data from sensors that
sense skin deformation of a finger while the finger performs
the touch interaction. In some implementations, a processor
performs a method to identify a touch interaction by execut-
ing instructions stored in a computer-readable medium. The
method obtains deformation data from a plurality of sensors.
The sensors are positioned adjacent to a plurality of portions
of a finger and configured to detect deformations of the
plurality of portions of the finger over time. The method
detects an event (e.g., make/break events or tap events)
based on the deformation data. The event detection may be
based on estimates of displacement and/or rate of displace-
ment. The method identifies a touch interaction (e.g., pick &
place (long pinches), quick pinches, taps on hard surfaces,
swiping on a surface, double tap) based on the detected
event.

18 Claims, 14 Drawing Sheets

(56) References Cited

U.S. PATENT DOCUMENTS

| | | | |
|---|---|---|---|
| 2015/0049056 A1* | 2/2015 | Post | G06F 3/041 |
| | | | 345/174 |
| 2015/0346929 A1* | 12/2015 | Karunamuni | G06F 3/0488 |
| | | | 715/777 |
| 2016/0278665 A1* | 9/2016 | Ferreira | A61B 5/6826 |
| 2016/0357297 A1* | 12/2016 | Picciotto | G06F 3/0488 |
| 2017/0083115 A1* | 3/2017 | Speck | G06F 3/0383 |
| 2018/0059787 A1* | 3/2018 | Keller | G06F 3/011 |
| 2018/0059852 A1* | 3/2018 | Sterling | G06F 3/041662 |
| 2019/0310713 A1 | 10/2019 | Wang et al. | |
| 2019/0339776 A1* | 11/2019 | Rosenberg | G06F 3/045 |
| 2019/0346938 A1* | 11/2019 | Wang | G06F 3/0446 |
| 2020/0356210 A1 | 11/2020 | Stone et al. | |

OTHER PUBLICATIONS

Kennedy, Hugh L., "A New Statistical Measure of Signal Similarity", Conference Paper—Mar. 2007, pp. 1-9.
Wikipedia—Savitzky-Golay filter, pp. 1-9, Jan. 17, 2022.
Wikipedia—Pearson Correlation Coefficient, pp. 1-10, Jan. 24, 2022.
Hsiu, MIn-Chieh, Wang, Chiuan, Huang, Da-Yuan, Lin, Jhe-Wei, Lin, Yu-Chih, Yang, De-Nian, Hung, Yi-ping and Chen, Mike, "Nail + Sensing Fingernail Deformation to Detect Finger Force Touch Interactions on Rigid Surfaces", National Taiwan University, pp. 1-6, Sep. 2016.
Saito, Ayane, Kuno, Wakaba, Kawai, Wataru, Miyata, Natsuki and Sugiura, Yuta,: "Estimation of Fingertip Contact Force by Measuring Skin Deformation and Posture with Photo-reflective Sensors"; pp. 1-6, AH2019, Mar. 11-12, 2019, Reims, France.

\* cited by examiner

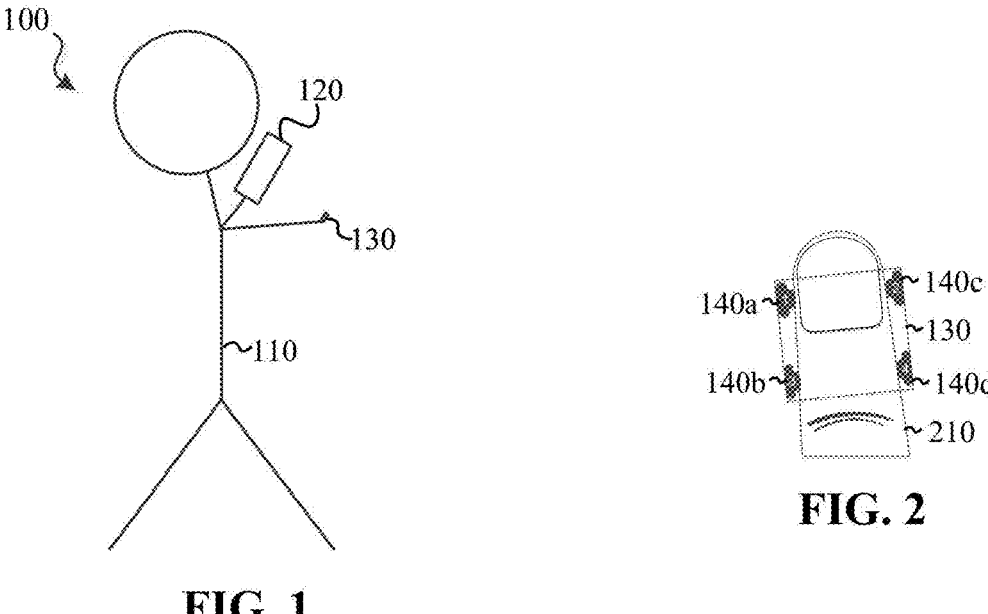
FIG. 1
FIG. 2
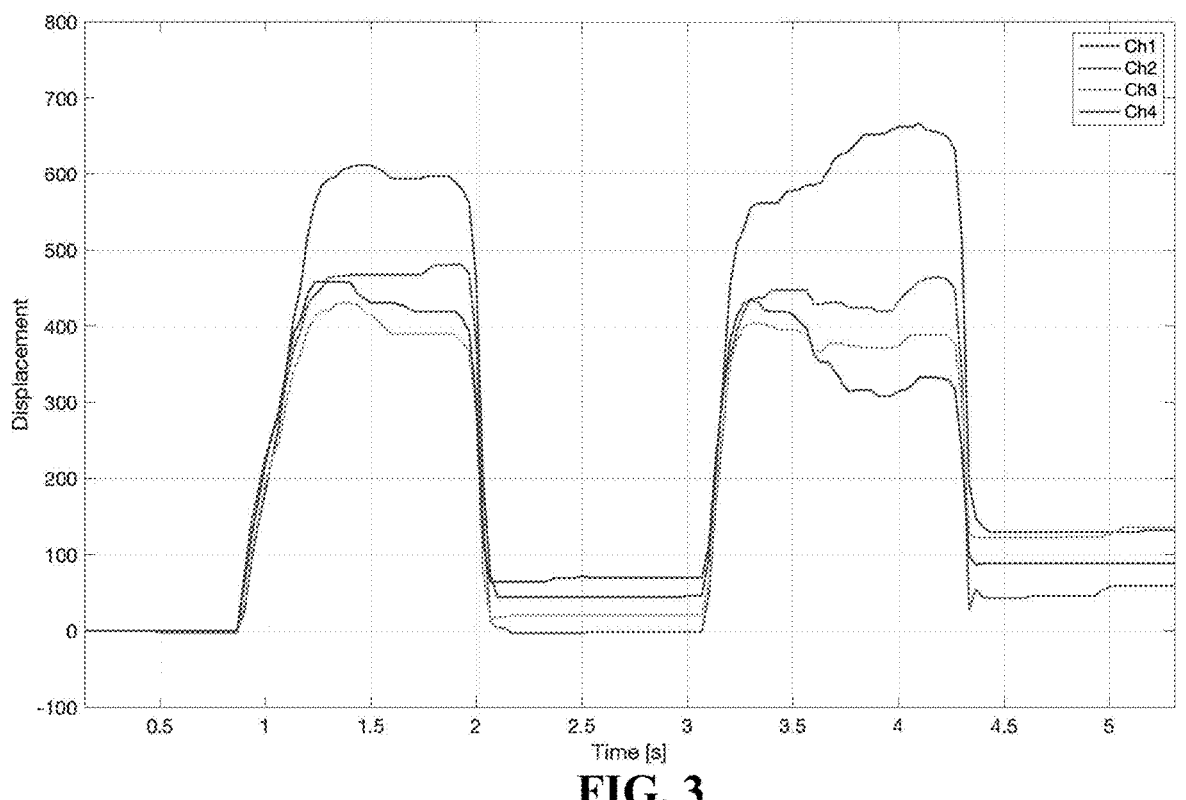
FIG. 3

Electronic Device 2600

TOUCH INTERACTION DETECTION

CROSS-REFERENCE TO RELATED APPLICATIONS

This Application claims the benefit of U.S. Provisional Application Ser. No. 63/147,789 filed Feb. 10, 2021, which is incorporated herein in its entirety.

TECHNICAL FIELD

The present disclosure generally relates to systems, methods, and devices for detecting interactions with electronic devices, and in particular, to facilitating touch interactions during use of electronic devices.

BACKGROUND

Electronic devices employ numerous techniques to detect and interpret user input. Some techniques require that users interact with input devices (e.g., a keyboard, a mouse, etc.) that rest on a table or other surface. Other techniques require that users interact with input devices (e.g., a joystick or mobile device touch screen) that the users grasp or hold. For still other techniques, users interact by providing movements that are captured in camera images or sounds that are captured by audio sensors. Existing techniques for detecting and interpreting user input may not adequately facilitate user experiences involving user touch interactions.

SUMMARY

Various implementations disclosed herein include devices, systems, and methods that facilitate touch interactions. A touch interaction is identified based on sensor data from a set of one or more sensors that sense skin deformation of a finger while the finger performs the touch interaction.

In some implementations, a processor performs a method to identify a touch interaction by executing instructions stored in a computer-readable medium. The method involves obtaining deformation data from a plurality of sensors. The sensors are positioned adjacent to a plurality of portions of a finger and configured to detect deformations of the plurality of portions of the finger. The deformation data includes time-based data corresponding to detecting the deformations of the plurality of portions of the finger over time. The method detects an event (e.g., make/break events or tap events) based on the deformation data. The event detection may be based on estimate a rate/velocity of deformation, adjusting baselines associated with the deformations, and/or confidence estimations. The method identifies a touch interaction (e.g., pick & place (long pinches), quick pinches, taps on hard surfaces, swiping on a surface, double tap) based on the detected event. Identifying the touch interaction may involve identifying the occurrence of and/or characteristics of the touch interaction. Identifying the touch interaction may involve determining a touch stage state (e.g., whether the finger is not touching, maybe touching, touching, maybe/about to break, etc.) corresponding to one or more types of touch interactions. Identifying the touch interaction may be based on determining a feature that provides a measurement of a physical interaction of the finger. For example, the method may determine an amount of force, a direction, or a magnitude of sheer based on the deformation data.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 1 illustrates an example of electronic devices used in a physical environment in accordance with some implementations.

FIG. 2 illustrates an electronic device positioned adjacent to portions of a finger in accordance with some implementations.

FIGS. 3-6 illustrate exemplary deformation data from the sensors of the device of FIG. 2 in accordance with some implementations.

Figure 4:
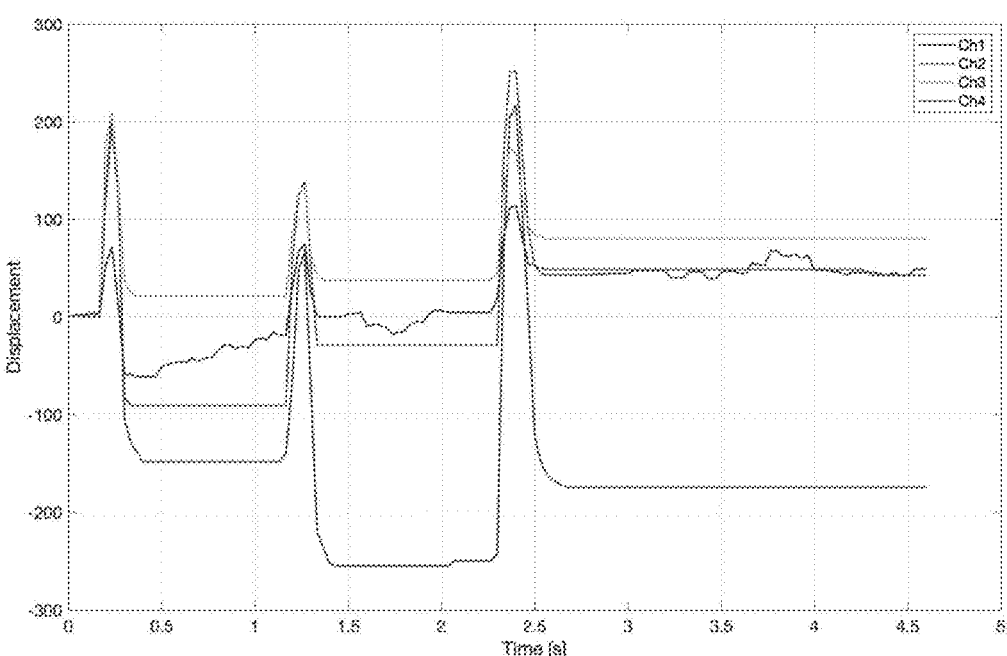

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

Referring to FIG. 1, a physical environment 100 in which aspects of the present disclosure may be implemented is illustrated. In general, physical environment 100 includes a first electronic device 120 configured to present a user 110 with content. In some implementations, the content includes an application or other computer-generated content. In some implementations, the content corresponds to a view of an environment, e.g., a view of the physical environment 100 or an eXtended Reality (XR) environment. As used herein, a physical environment refers to a world that individuals can sense and/or with which individuals can interact without assistance of electronic systems. Physical environments (e.g., a physical forest) include physical elements (e.g., physical trees, physical structures, and physical animals) that an individual can touch to provide a touch interaction. Individuals can directly interact with and/or sense the physical environment, such as through touch, sight, smell, hearing, and taste.

The physical environment also includes a second electronic device 130 configured to obtain data from which user input may be determined. For example, the second electronic device 130 may be a wearable device (e.g., a finger-mounted device, a ring, a hand glove, a finger glove, etc.). The input determined from the sensor data obtained by the second electronic device 130 may be used to provide inter-activity on the first electronic device 120. For example, deformation data may be obtained by the second electronic device 130 corresponding to skin deformation on a portion of a hand (e.g., a finger) of the user 110 and that deformation data may be used to identify a touch interaction performed by the portion of the hand of the user 110.

FIG. 2 illustrates the second electronic device 130 positioned adjacent to portions of a finger 210 of the user 110. In this example, the second electronic device 130 includes four deformations sensors 140a-d configured to detect deformations of the finger 210 at different locations on the finger 210. Specifically, in this example, the deformation sensor 140a is positioned adjacent to a first portion (e.g., at a distal location on the left side) of the finger 210, the deformation sensor 140b is positioned adjacent to a second portion (e.g., at a proximal location on the left side) of the finger 210, the deformation sensor 140c is positioned adjacent to a third portion (e.g., at a distal location on the right side) of the finger 210, and the deformation sensor 140d is positioned adjacent to a fourth portion (e.g., at a proximal location on the right side) of the finger 210. The four deformations sensors 140a-d of the second electronic device 130 may utilize one or more pliable membranes that make contact with portions of skin of the finger 210 and deform as those portions of skin deform. The four deformations sensors 140a-d of the second electronic device 130 may utilize LASER interferometry to detect membrane (and thereby skin) deformation and/or ultrasound to identify skin deformation.

Each of the four deformations sensors 140a-d provides a different channel of finger deformation data captured over time as at the user 110 wears the second electronic device 130 on his or her finger. In some implementations, the second electronic device 130 does not cover the underside (not shown) of the finger 210 such that the user can perform touch interactions using an exposed underside of the finger 210. In some implementations, the second electronic device 130 covers the underside (not shown) of the finger 210 such that the user can perform touch interactions using the covered underside of the finger 210.

In some implementations, the second electronic device 130 is used to detect input based on deformations of the finger 210, and the input is used by the first electronic device 120. The first electronic device 120 may be a wearable electronic device such as a head mounted device that provides views of an XR environment (e.g., a virtual reality environment, an augmented reality environment, or other 3D environment) in which the user 110 provides input using touch interactions using finger 210. In some implementations, the second electronic device 130 is configured to be worn by the user 110 for extended periods of time, during other activities (e.g., walking, using a keyboard, etc.), and/or without requiring that the user hold, grasp, or repeatedly set down and pick up the second electronic device 130 to grasp or use other objects. The second electronic device 130 may securely attach to the finger 210 of the user 110, for example, by having a shape or physical properties that cause the second electronic device 130 that provide pressure or friction against the second electronic device 130 inhibiting its removal while in an attached position on the finger 210.

Figure 5:
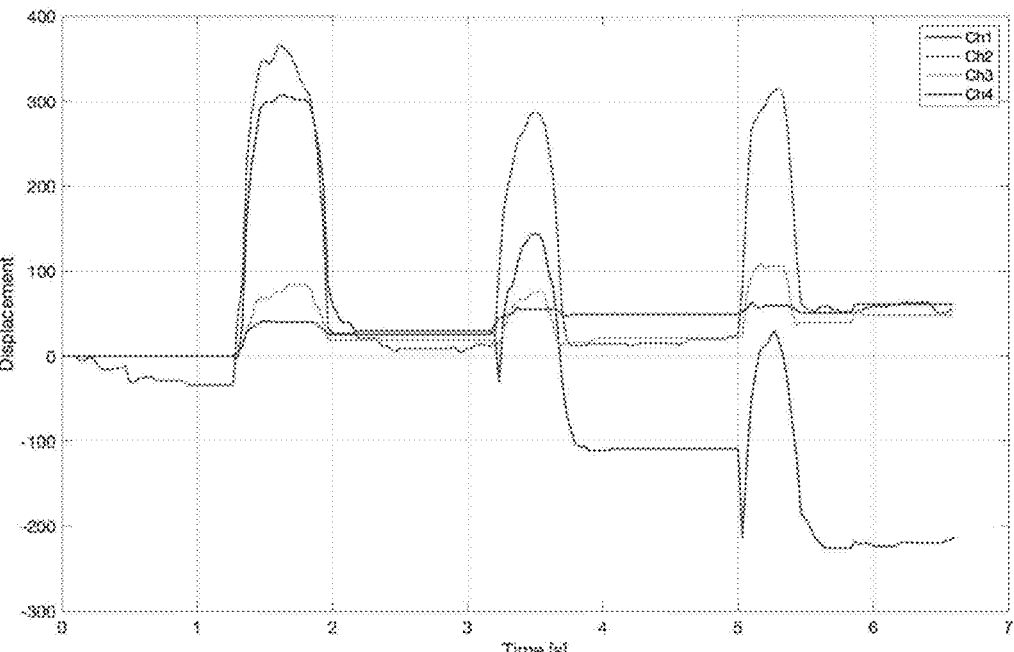
Figure 6:
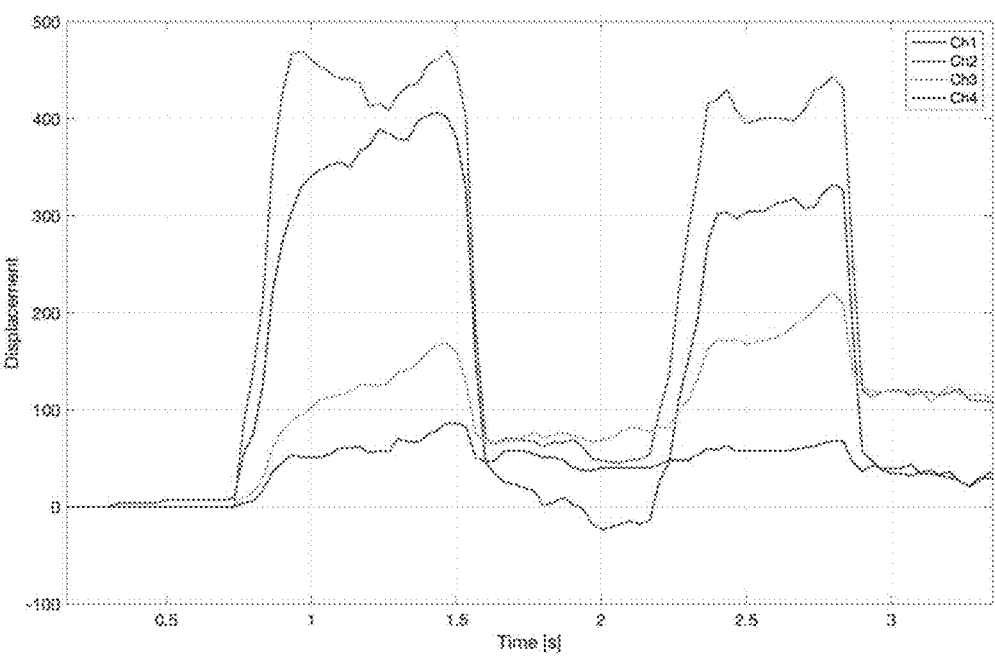

FIGS. 3-6 illustrate exemplary deformation data from the sensors of the second electronic device 130. FIG. 3 illustrates deformation data from the four channels corresponding to the four deformations sensors 140a-d of the second electronic device 130 of FIG. 2 during an exemplary long pinch touch interaction. FIG. 4 illustrates deformation data from the four channels during an exemplary quick pinch touch interaction. FIG. 5 illustrates deformation data from the four channels during an exemplary tap on a surface touch interaction. FIG. 6 illustrates deformation data from the four channels during an exemplary swiping on a surface touch interaction.

FIGS. 3-6 illustrate multiple channels of deformation data one or more of which may be analyzed periodically or on an ongoing basis to identify touch interactions performed by the finger 210. For example, the deformation data associated with most or all touch interactions of a given type (e.g., long pinch, quick pinch, tap on surface, swipe on surface, etc.) may have characteristics from which the respective type of touch interaction can be distinguished from other types of touch interactions as well as from circumstances in which no touch interactions occur. Accordingly, the deformation may be used to identify when the user performs a touch interaction and to identify one or more characteristics of the touch interaction when it occurs, e.g., the type of the touch interaction, the duration of the touch interaction, a quantity (e.g., amount of movement) associated with the touch interaction, etc.

Figure 7:
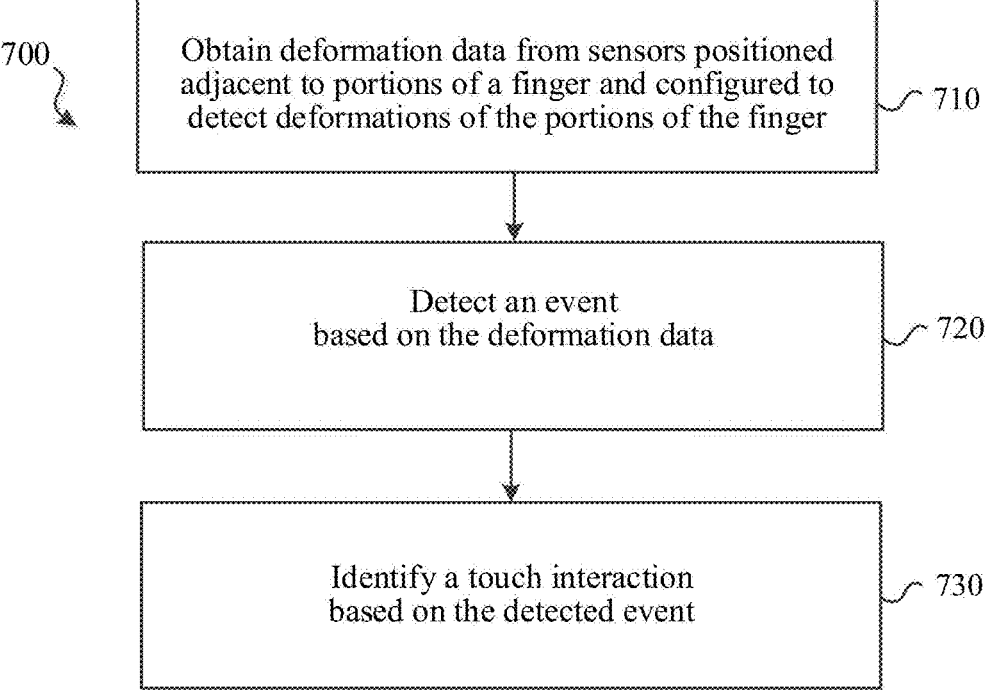
FIG. 7 is a flowchart illustrating an example of a method of identifying a touch interaction in accordance with some implementations.

FIG. 7 is a flowchart illustrating an example of a method 700 of identifying a touch interaction. In some implementations, the method 700 is performed by one or more electronic devices (e.g., by one or both of electronic devices 120, 130). The method 700 can be performed at a mobile device, head mounted device (HMD), wearable device, desktop, laptop, or server device. In some implementations, the method 700 is performed by processing logic, including hardware, firmware, software, or a combination thereof. In some implementations, the method 700 is performed by a processor executing code or other instructions stored in a non-transitory computer-readable medium (e.g., a memory).

At block 710, the method 700 obtains deformation data from sensors positioned adjacent to portions of a finger and configured to detect deformations of portions of the finger over time. For example, deformation data may be obtained from sensors such as deformation sensors 140*a-d* of the second electronic device 130 illustrated in FIG. 2. The sensors may use one or more pliable membranes that make contact with skin of the finger 210 and deform at the skin deforms. In some implementations, LASER interferometry is used to detect membrane (and thereby skin) deformation that occur proximate each respective sensor. Such deformation detection may identify a measure of displacement, e.g., a numerical measure of an amount of change in the position of portions of the skin over time. Such displacement data may be used to determine rate data, e.g., providing numerical values representing a rate of change of the displacement data over time. Deformation data, e.g., including but not limited to displacement data and rate data, may be tracked over time, for example on an ongoing basis.

At block 720, the method 700 detects an event (e.g., a make event, a break event, a tap event, etc.) based on the deformation data. The event detection may be based on estimate of displacement (e.g., how much the skin of the finger has been displaced) and/or a rate/velocity of displacement. For example, each of a number of (e.g., two, three, four, five, etc.) deformation sensors may provide measures of displacement corresponding to respective portions of the skin of the finger. Detecting the event may be based on an estimation of displacement of the finger that is adjusted to account for a baseline displacement of the finger. Rate/velocity may be determined using various techniques including, but not limited to, using Savitzky-Golay filters and discrete-time adaptive windowing, for example, as described in F. Janabi-Sharifi, V. Hayward and C.-J. Chen, "Discrete-time adaptive windowing for velocity estimation," in *IEEE Transactions on Control Systems Technology*, vol. 8, no. 6, pp. 1003-1009, November 2000 doi: 10.1109/87.880606, incorporated herein by this reference.

At block 730, the method 700 identifies a touch interaction (e.g., an occurrence of and/or characteristics of a touch interaction) based on the detected event. Identifying the occurrence of and/or characteristics of the touch interaction may be based on detecting an event (e.g., make/break events or tap events). One or more events may correspond to and thus be used to identify a touch interaction. Identifying the touch interaction may include identifying a type of the touch interaction, e.g., whether the touch interaction is a pinch of the finger against another finger, a tap (or double tap) of the finger on a surface, a swipe of the finger on the surface, a long pinch, a quick pinch, etc.

The method 700 may further involve determining a measurement of a physical interaction of the finger based on the deformation data. For example, this may involve determining a feature such as an amount of force, a direction of a force, a magnitude of sheer, or other measure of a physical interaction based on deformation data from one or more of the sensors. The touch interaction may be identified based on the measurement. For example, the amount of force associated with an event may be used to identify an occurrence of and/or characteristics of a touch interaction.

In some implementations, event detection is based on deformation data from at least 4 sensors—at least 4 separately positioned deformation sensors. In some implementations, a subset of sensor data is selected (e.g., data from 2 of 4 sensors) and used to detect events and/or associated touch interactions.

The event detection and/or touch interaction identification may be based on adjusting baselines associated with the deformations and confidence estimations as described with reference to FIG. 20 herein.

FIGS. 8-15 illustrates exemplary touch interactions that may be performed while a user is using a device such as the second electronic device 130 of FIG. 2 and identified, for example, using the method 700 of FIG. 7. In these examples a device (not shown) is worn on the finger 210 and used to obtain deformation data during the touch interactions.

Figure 8:
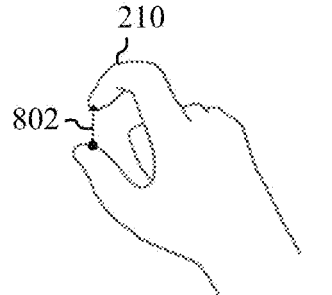
FIGS. 8-15 illustrates exemplary touch interactions that may be performed while a user is using a device such as the device of FIG. 2 in accordance with some implementations.
Figure 8:
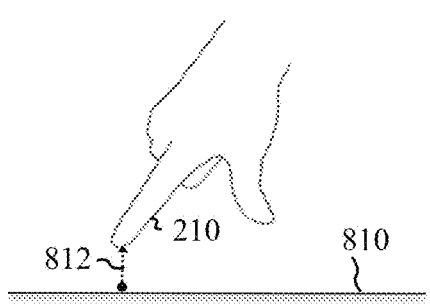

FIG. 8 illustrates two examples of stationary make/break touch interactions with no intentional finger shear or slide. In the first example, the finger 210 touches a thumb (making contact) and then moves away along path 802 (breaking contact). In the second example, the finger 210 touches a surface 810 (making contact) and then moves away along path 812 (breaking contact).

Figure 9:
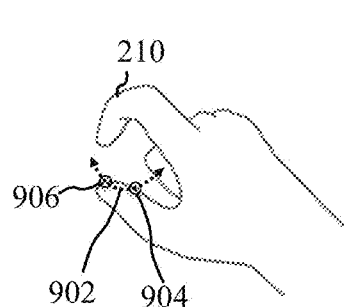
Figure 9:
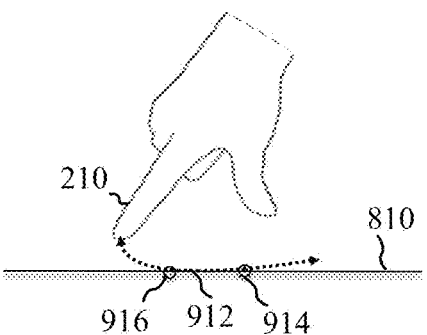

FIG. 9 illustrates two examples of make/break touch interactions with motion. In the first example, the finger 210 follows path 902 during which it makes contact (at point 904) with the thumb, maintains contact, and then breaks contact (at point 906) with the thumb. In the second example, the finger 210 follows path 912 during which it makes contact (at point 914) with the surface 810, maintains contact, and then breaks contact (at point 916) with the surface 810.

Figure 10:
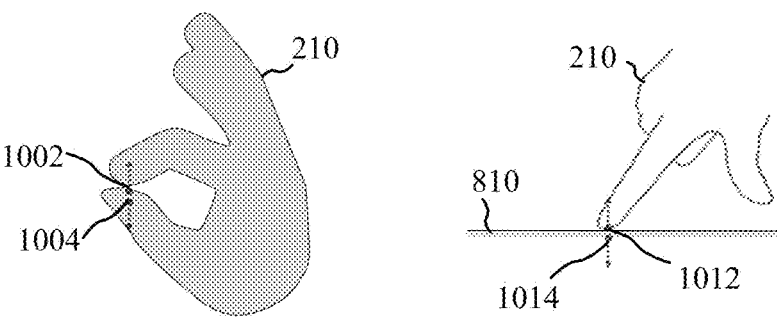

FIG. 10 illustrates two examples of a force press touch interaction using a single threshold. In the first example, the finger 210 touches a thumb with a force that exceeds a threshold. This may be determined based on an amount of displacement occurring when the finger 210 makes contact with the thumb (at point 1002) compared to the amount of displacement occurring as the user continues to apply force (at point 1004). In the second example, the finger 210 touches a surface 810 with a force that exceeds a threshold. This may be determined based on an amount of displacement occurring when the finger 210 makes contact with the thumb (at point 1102) compared to the amount of displacement occurring as the user continues to apply force (at point 1104).

Figure 11:
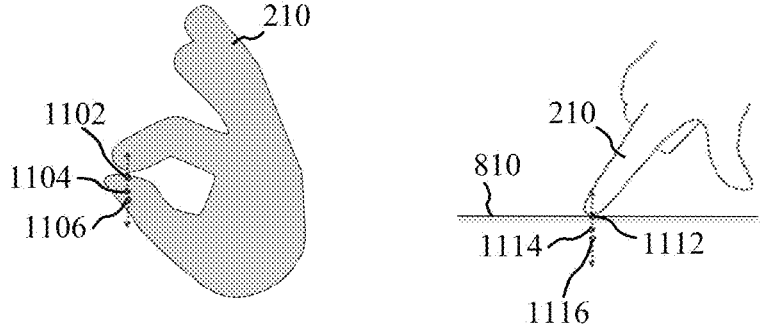

FIG. 11 illustrates two examples of a 2-step force press touch interaction using a double threshold. In the first example, the finger 210 touches a thumb with a force that exceeds a first threshold and then a second threshold. This may be determined based on an amount of displacement occurring when the finger 210 makes contact with the thumb (at point 1102) compared to the amount of displacement occurring as the user continues to apply force (at point 1004 and at point 1006). In the second example, the finger 210 touches a surface 810 with a force that exceeds a first threshold and then a second threshold. This may be determined based on an amount of displacement occurring when the finger 210 makes contact with the thumb (at point 1112) compared to the amount of displacement occurring as the user continues to apply force (at point 1114 and at point 1116).

Figure 12:
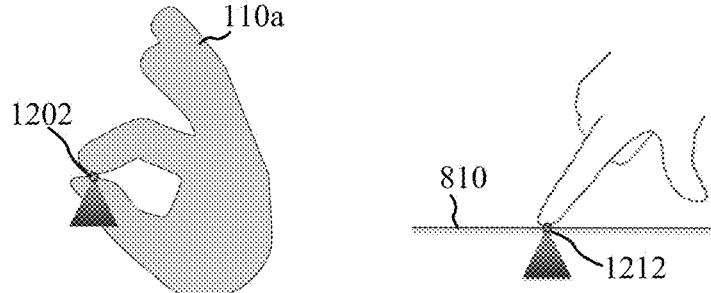

FIG. 12 illustrates two examples of a force press touch interaction that uses continuous force regulation. In the first example, the finger 210 touches a thumb and force following the touch is tracked. The force may be tracked based on an amount of displacement occurring when the finger 210 makes contact with the thumb (at point 1202) compared with the amount of displacement that subsequently occurs (e.g., until the finger 210 breaks contact). In the second example, the finger 210 touches a surface 810 and the force following the touch is tracked. This may be determined based on an amount of displacement occurring when the finger 210 makes contact with the surface 810 (at point 1212) compared with the amount of displacement that subsequently occurs (e.g., until the finger 210 breaks contact).

Figure 13:
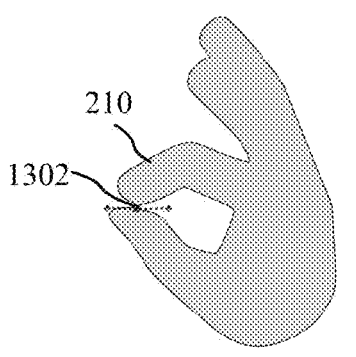
Figure 13:
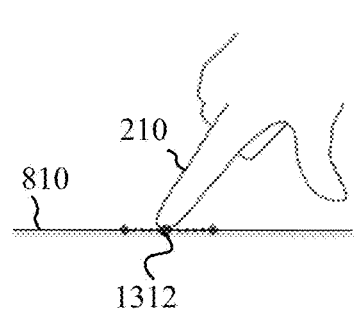

FIG. 13 illustrates two examples of a discrete 1D joystick (i.e., toggle-switch) touch interaction. Detecting such an interaction may involve detecting a direction of finger movement based on detecting a tap and 2D shear start/end indicative of a binary left or right direction. In the first example, the finger 210 touches a thumb at a point 1302 and then moves in one of two directions in a single dimension as detected based on detecting 2D shear start and end. In the second example, the finger 210 touches a surface 810 at a point 1312 and then moves in one of two directions in a single dimension as detected based on detecting 2D shear start and end. The magnitude of the shear may be used to determine a magnitude associated with the touch interaction.

Figure 14:
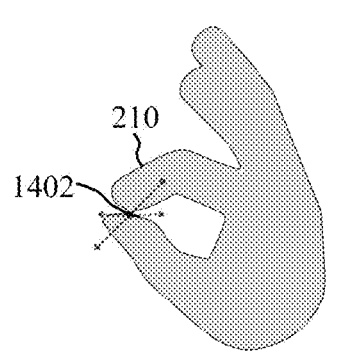
Figure 14:
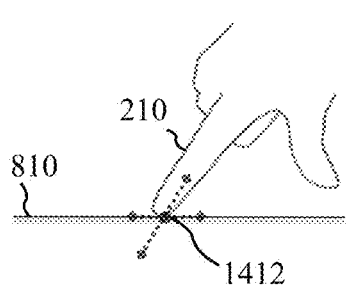

FIG. 14 illustrates two examples of a discrete 2D joystick touch interaction. Detecting such an interaction may involve detecting a direction of finger movement based on detecting a tap and 2D shear start/end indicative of a discrete direction. In the first example, the finger 210 touches a thumb at a point 1402 and then moves in one of four directions in two dimensions as detected based on detecting 2D shear start and end. In the second example, the finger 210 touches a surface 810 at a point 1412 and then moves in one of four directions in two dimensions as detected based on detecting 2D shear start and end. The magnitude of the shear may be used to determine a magnitude associated with the touch interaction.

Figure 15:
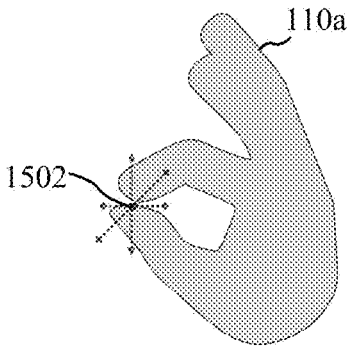
Figure 15:
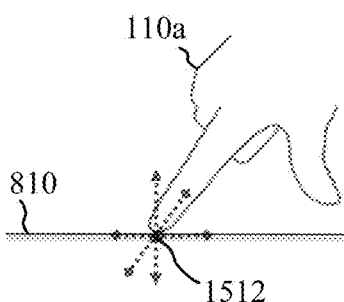

FIG. 15 illustrates two examples of a discrete 3D joystick touch interaction. Detecting such an interaction may involve detecting a direction of finger movement based on detecting a tap and 2D shear start/end or force indicative of a discrete direction. In the first example, the finger 210 touches a thumb at a point 1502 and then moves in one of four directions in two dimensions on a surface of the thumb as detected based on detecting 2D shear start and end or in one of two directions in another dimension perpendicular to the surface of the thumb, which is detected based on detecting force. In the second example, the finger 210 touches a surface 810 at a point 1412 and then moves in one of four directions in two dimensions on the surface 810 as detected based on detecting 2D shear start and end or in one of two directions in another dimension perpendicular to the surface 810, which is detected based on detecting force. The magnitude of the shear and/or force may be used to determine a magnitude associated with the touch interaction.

Touch interactions may be determined based on deformation data that is indicative of a measurement of a physical interaction of a finger. Patterns of deformation data (e.g., displacement and/or rate of displacement) may correspond to force, direction, magnitude of shear, etc. For example, an asymmetric deformation of the finger as indicated by a pattern of displacement may indicate an asymmetric deformation of the finger that indicates a shear and may be used to identify a magnitude of the shear. Another pattern of deformation of the finger may indicate that that the finger is applying an orthogonal force and may be used estimate a magnitude of such a force.

Figure 16:
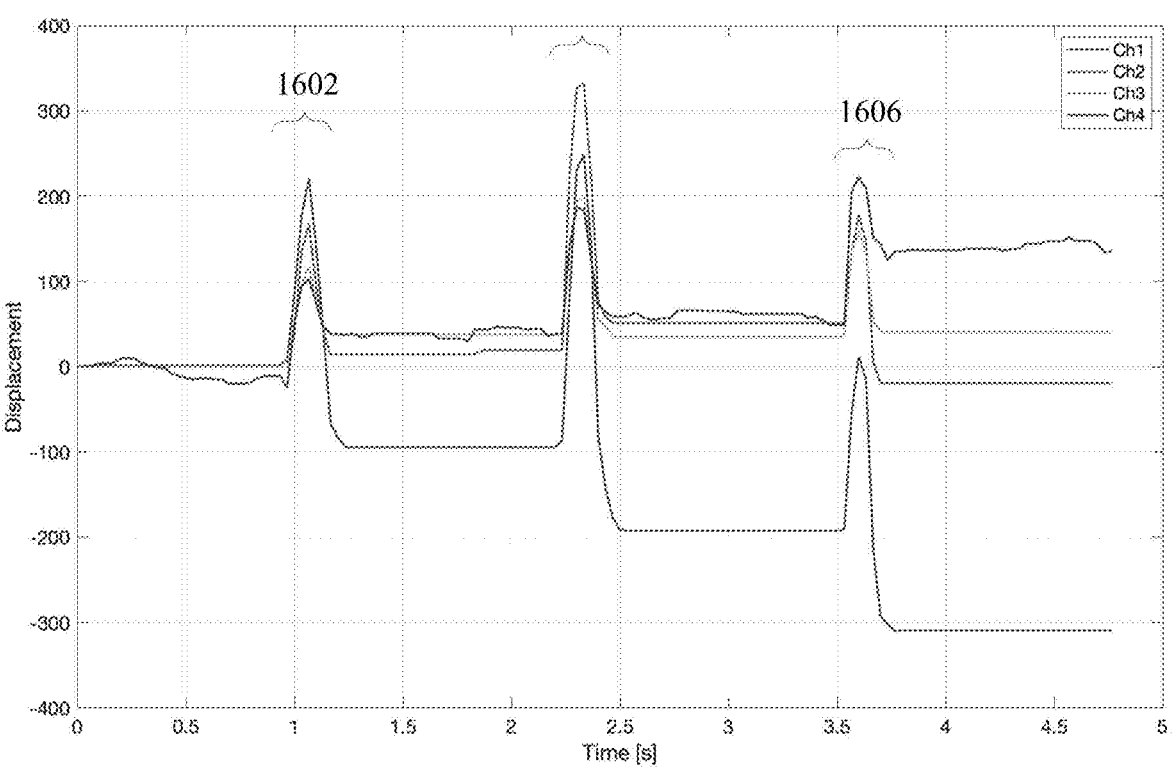
FIGS. 16-19 illustrates exemplary deformation data from the sensors of the device of FIG. 2 in accordance with some implementations.

FIGS. 16-19 illustrates exemplary deformation data from the sensors of the device of FIG. 2 to illustrate various deformation data characteristics that may be accounted for in using such data to identify touch interactions. FIG. 16 illustrates a deformation data shift that occurs during interactions. The deformation data includes data corresponding to interaction periods 1602, 1604, 1606 at which a sequence of touch interactions occurred. The sensors may exhibit a shift between these touch interactions. For example, before the first interaction period 1602, the deformation data may correspond to a baseline displacement of approximately 0. However, as illustrated, following the first interaction period

Figure 17:
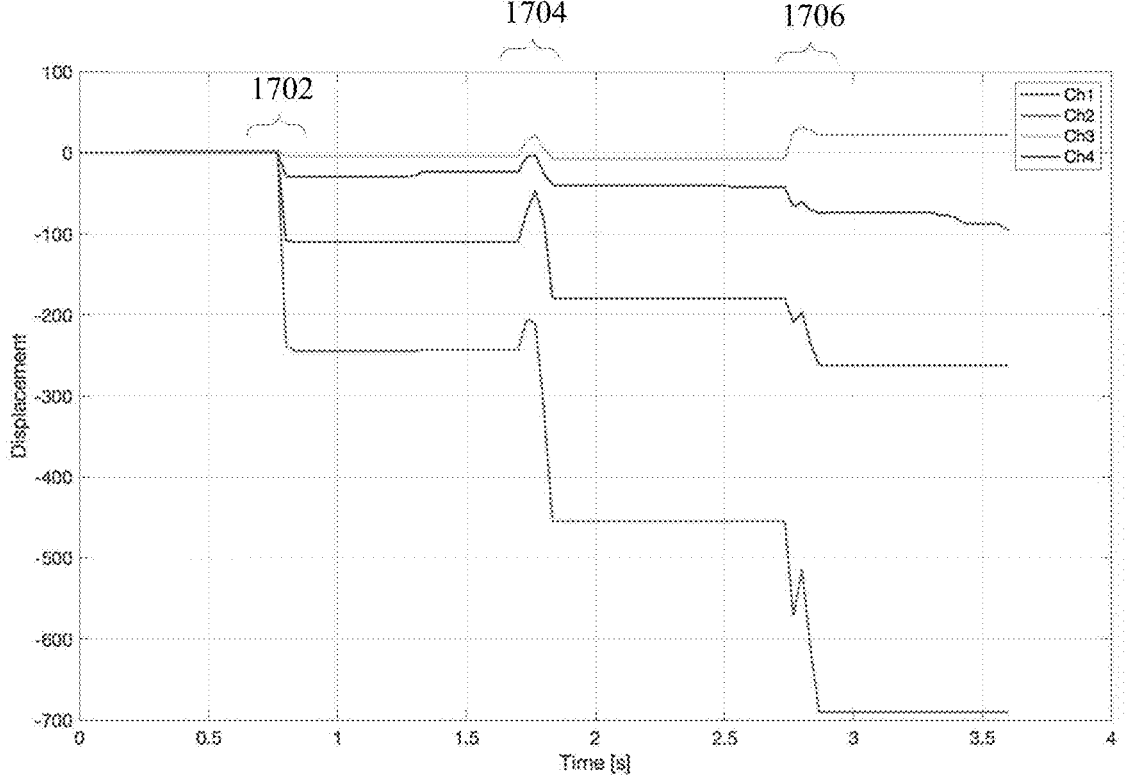
Figure 18:
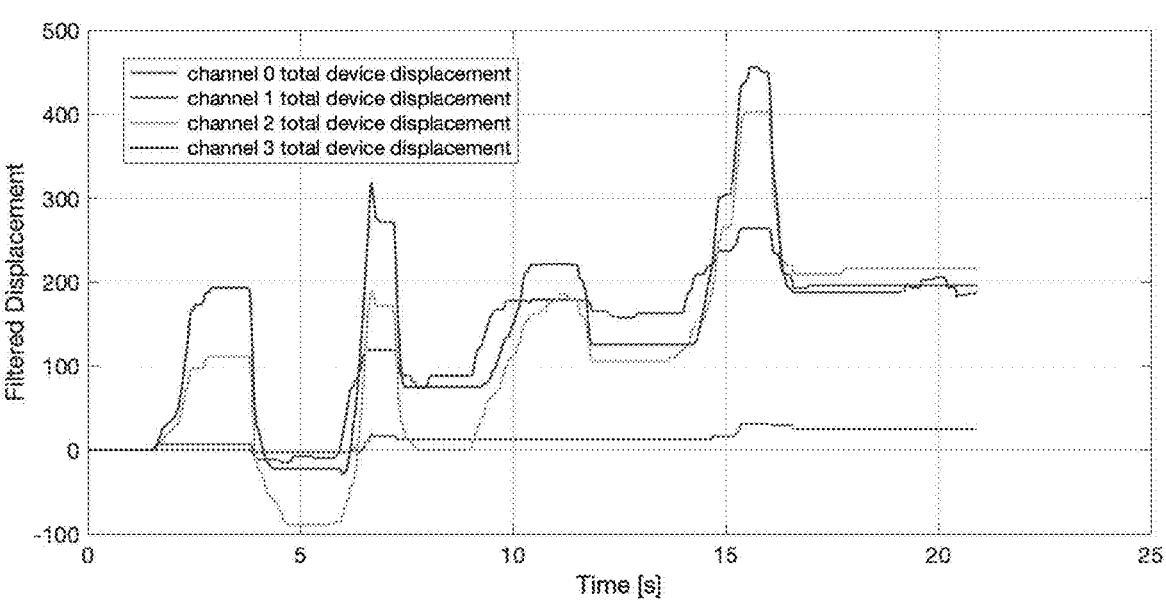
Figure 19:
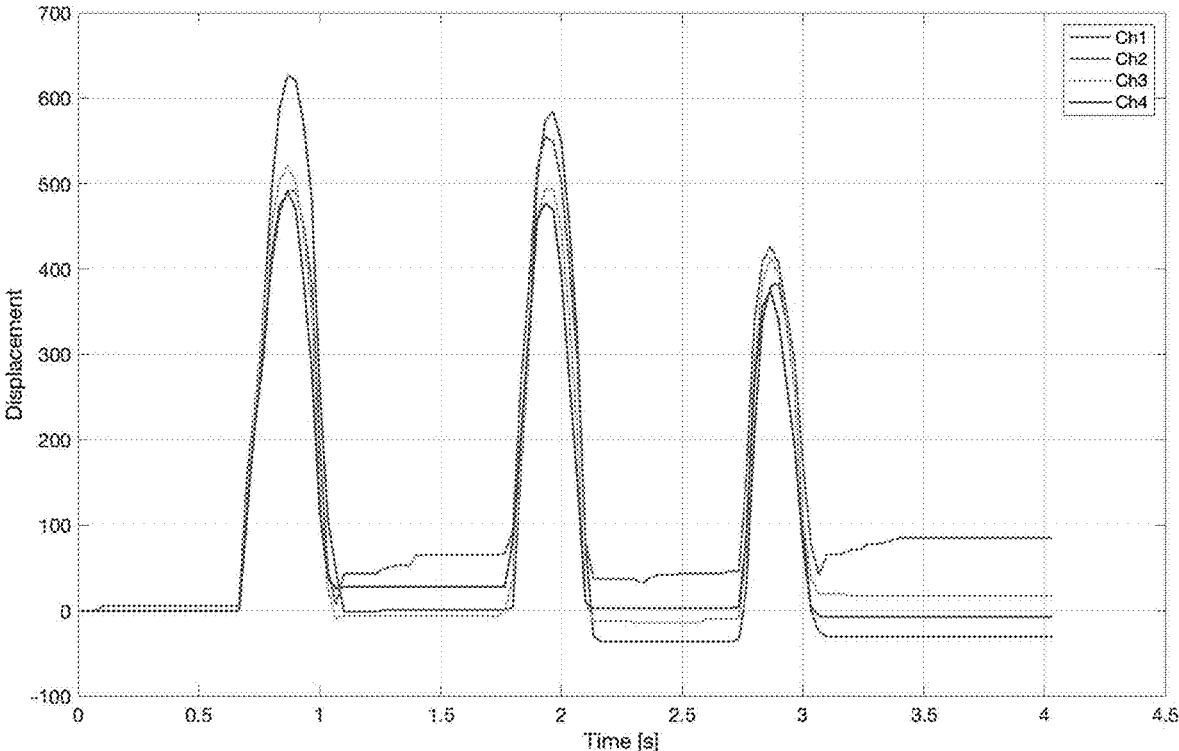

1602 (and the subsequent interaction periods 1604, 1606) the baseline displacement may have shifted and thus may not correspond to the same baseline. FIG. 17 illustrates exemplary aliasing artifacts. The deformation data comprises data corresponding to interaction periods 1702, 1704, 1706 at which a sequence of fast surface tap touch interactions occurred. The sensors may exhibit artifacts, in which one or more of the channels has a substantially changed baseline or data that may not correspond to the actual deformations of the finger, e.g., where the finger reforms faster than the sensor membrane. FIG. 18 illustrates that there may be similarities between patterns of deformation data associated with a touch interaction (e.g., a pinch) and deformation data associated with a non-touch event (e.g., a finger flexing in the air). FIG. 19 illustrates that there may be signal drift that occurs within one or more of the channels.

Figure 20:
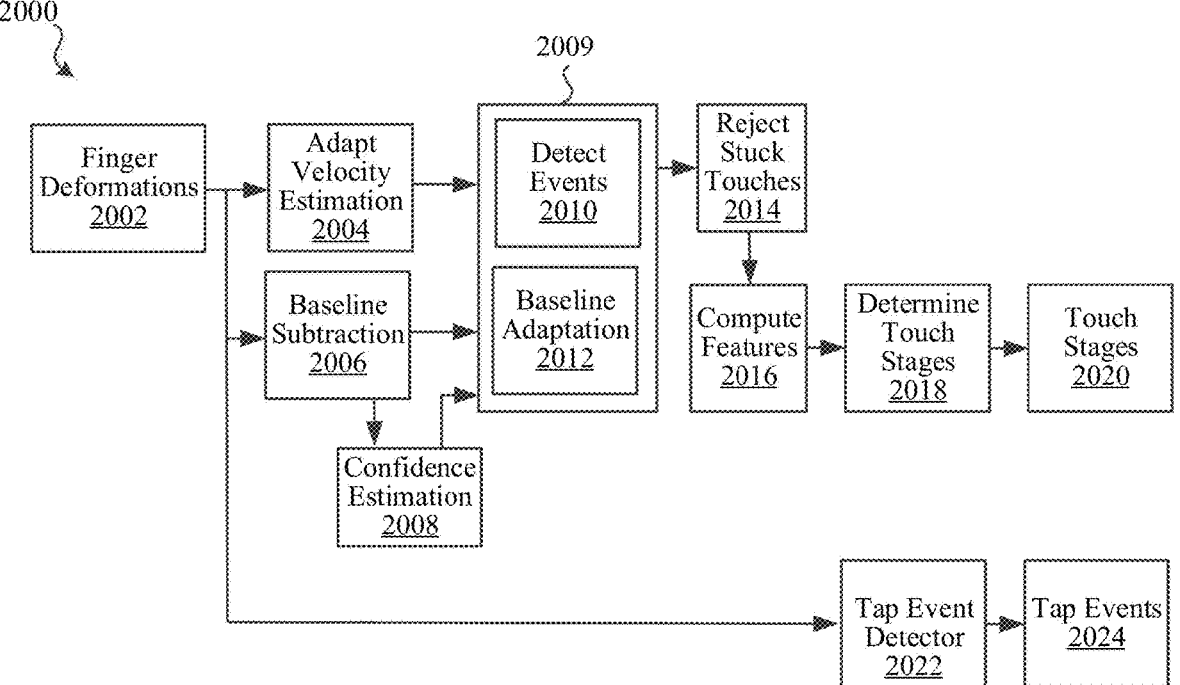
FIG. 20 illustrates an exemplary touch detection process in accordance with some implementations.

FIG. 20 illustrates an exemplary touch detection process 2000. In this exemplary process 2000, finger deformation data 2002 (e.g., from the deformation sensors 140a-d of device 130) is used as the input. Such finger deformation data 2002 may include time-based data that is received/processed on continuously, e.g., using a sliding evaluation window, or otherwise. The finger deformation data 2002 may include data from multiple channels (e.g., from individual deformation and/or other sensors) that are evaluated individually and/or in combination with one another.

The finger deformation data 2002 is processed at the adapt velocity estimation block 2004 and the baseline subtraction block 2006. The adapt velocity estimation block 2004 receives the finger deformation data 2002 and provides adapted rate estimates, e.g., data regarding the rates at which the displacement data changes in each channel. The baseline subtraction block 2006 adjusts the deformation data to determine net displacement data, e.g., by subtracting baseline values from the displacement values provided by each channel. The confidence estimation block 2008 provides confidence estimates based on detecting inconsistencies in the deformation data. The confidence estimates may provide a measure of confidence that a set of data corresponds to a touch or not. Various statistical correlation estimation measures may be used to compute the confidence estimate. Some implementations use a signal similarity measure, for example, as described in H. L. Kennedy, "A New Statistical Measure of Signal Similarity," 2007 *Information, Decision and Control*, Adelaide, S A, Australia, 2007, pp. 112-117, doi: 10.1109/IDC.2007.374535, incorporated herein by this reference.

The adapted rate estimates, net displacement data, and confidence estimates are provided to block 2009. Within block 2009, the baseline adaptation block 2012 accounts for baseline adaptations and the detect events block 2010 identifies one or more events, which may be used to identify touch interactions. For example, the detect events block 2010 may identify make events (touch down events), break events (touch up events), etc.

The reject stuck touches block 2014 recognizes patterns of deformation data and/or detected events that corresponds to stuck touches and rejects them. This may involve, for example, detecting that the data from a single channel (or small subset of channels) is drifting up and thus should be rejected. The features that are tested/detected will generally correspond to and thus be used to identify the occurrence of and characteristics of potential touch interactions that are being considered.

The compute features block 2016 identifies features (e.g., measurements corresponding to physical interactions of the finger such as force, direction, magnitude of sheer, etc.). The features are provided to the determine touch stages block 218, which may be a state machine, machine learning model, or other computational component that uses the features to determine touch stages, e.g., not touching, maybe touching/ about to touch, touching, and maybe breaking/about to break. These touch stages may be used to determine a type or other characteristics of a touch interaction of a touch that has occurred.

The process 2000 also includes features that are dedicated to detecting touch interactions that are taps. The finger deformation data 2002 is input to a tap event detector block 2022 dedicated to detecting and outputting tap events 2024. The tap detection may involve distinguishing between single taps, double taps, triple taps, etc., based on one or more time thresholds. This may involve, for example, associating two taps within a predetermined time window (e.g., 100 ms) with one another as a double tap touch interaction. In an alternative example, the type of a tap (single, double, etc.) is based on detecting a pattern in the displacement data. For example, a double tap may be associated with an identifiable pattern that is distinguishable from the pattern associated with two consecutive single taps.

Figure 21:
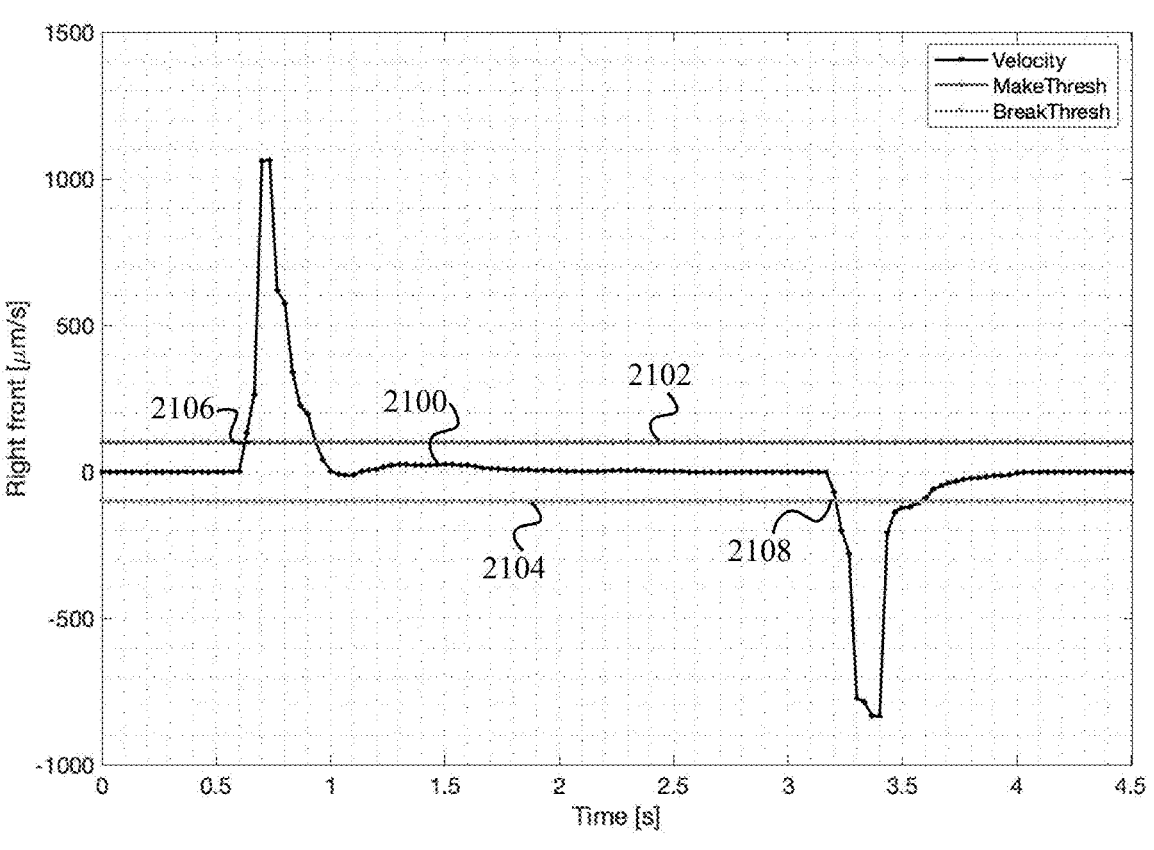
FIGS. 21-22 illustrate the use of exemplary make and break thresholds in accordance with some implementations.
Figure 22:
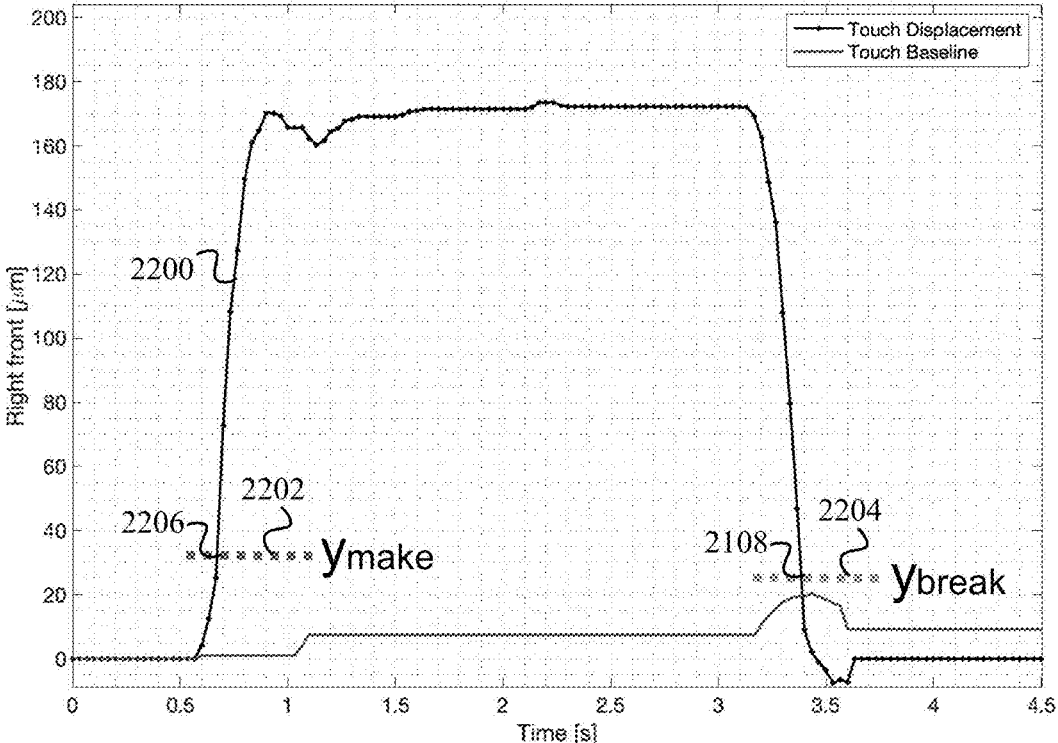

FIGS. 21-22 illustrate the use of exemplary make and break thresholds. FIG. 21 illustrates rate-based make/break detection based on tracking displacement rate (i.e., velocity) 2100 and using a make threshold 2102 and a break threshold 2104. A make touch event is detected based on detecting a positive velocity crossing the make threshold 2102 at point 2106. A break event is detected based on detecting a negative velocity crossing the break threshold 2104 at point 2108. In some implementations, detecting such events occurs for each channel and these events are fed into a touch stage state machine to determine a touch state stage, e.g., not touching, maybe touching, touching, and maybe breaking, etc.

FIG. 22 illustrates displacement-based make/break detection based on tracking displacement and using a make threshold 2202 and a break threshold 2204. A make touch event is detected based on detecting a baselined displacement 2200 exceeding the make threshold 2202 at point 2206. A break event is detected based on detecting baselined displacement 2200 falling below the break threshold 2204 at point 2208.

In some implementations additional rules and checks are performed to account for potential anomalies. For example, such a rule may require baselined displacement to fall below a certain fraction of max displacement in order to detect a break. In another example, a minimum touch duration (e.g., 0.1 seconds) may be required to prevent accidental breaks from being detected. In another example, a stuck touch flag on a single channel is cleared after a predetermined time period, e.g., 0.5 seconds.

Figure 23:
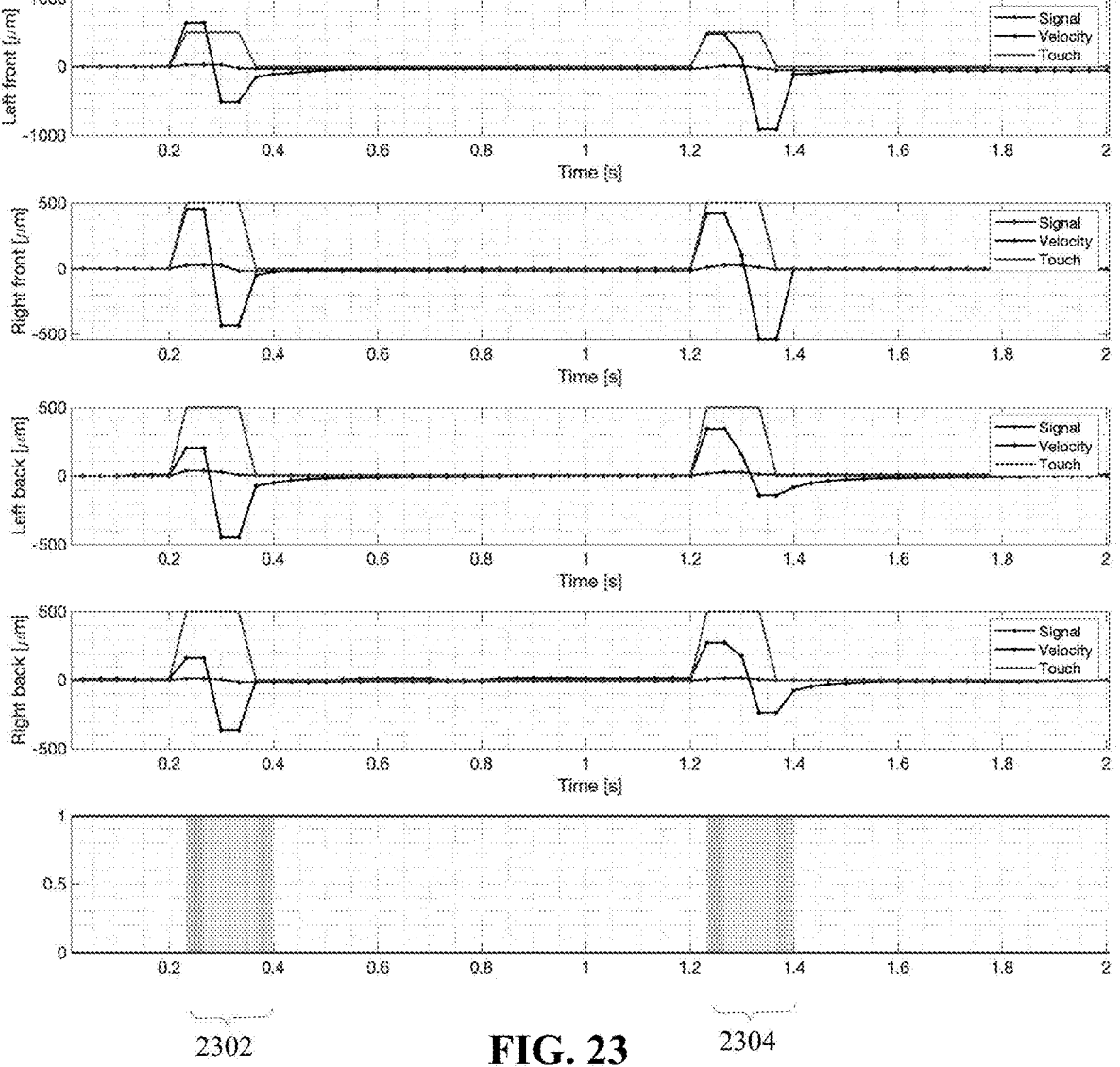
FIGS. 23-25 illustrates touch interaction detection based on deformation data in accordance with some implementations.
Figure 24:
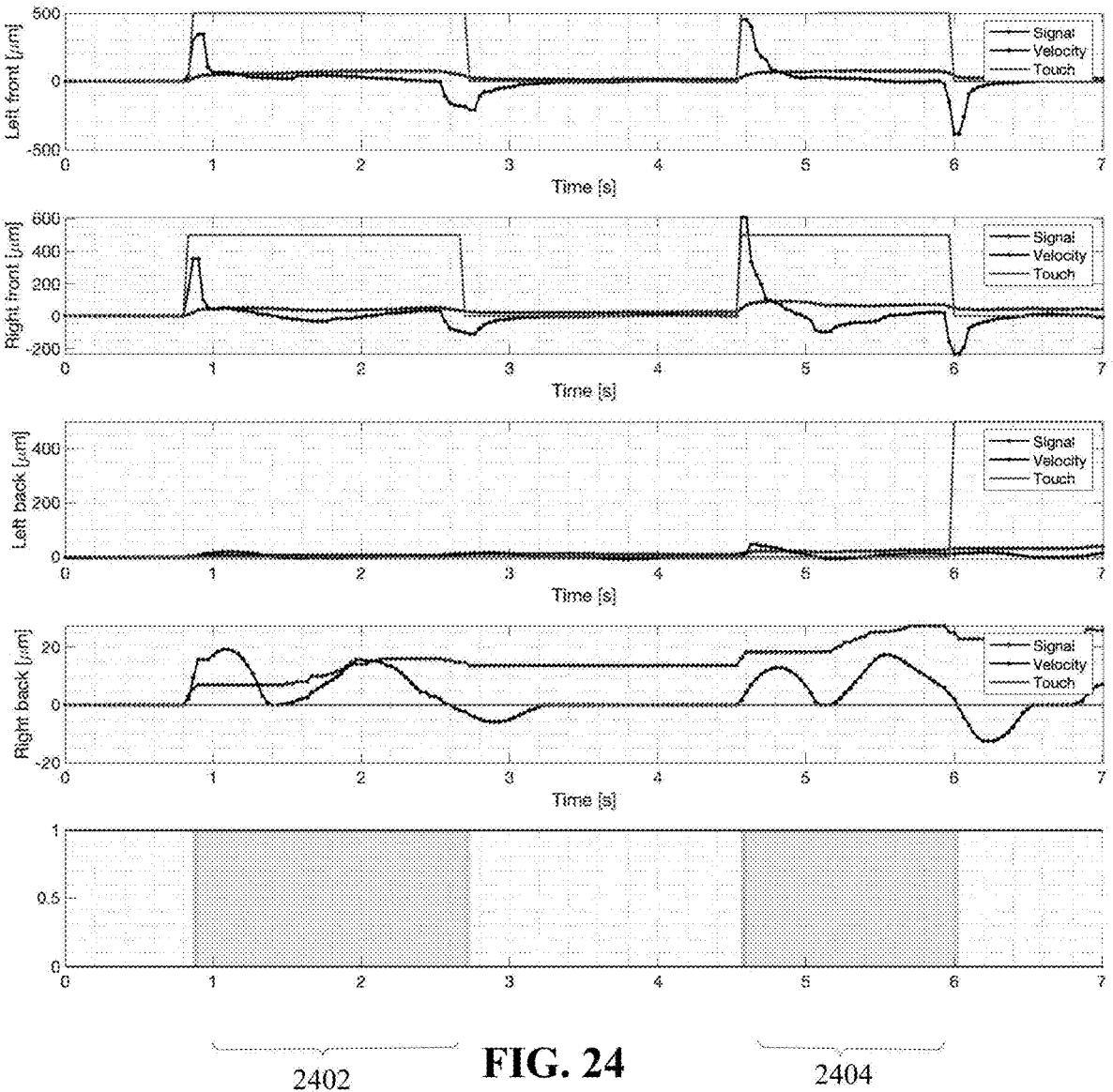
Figure 25:
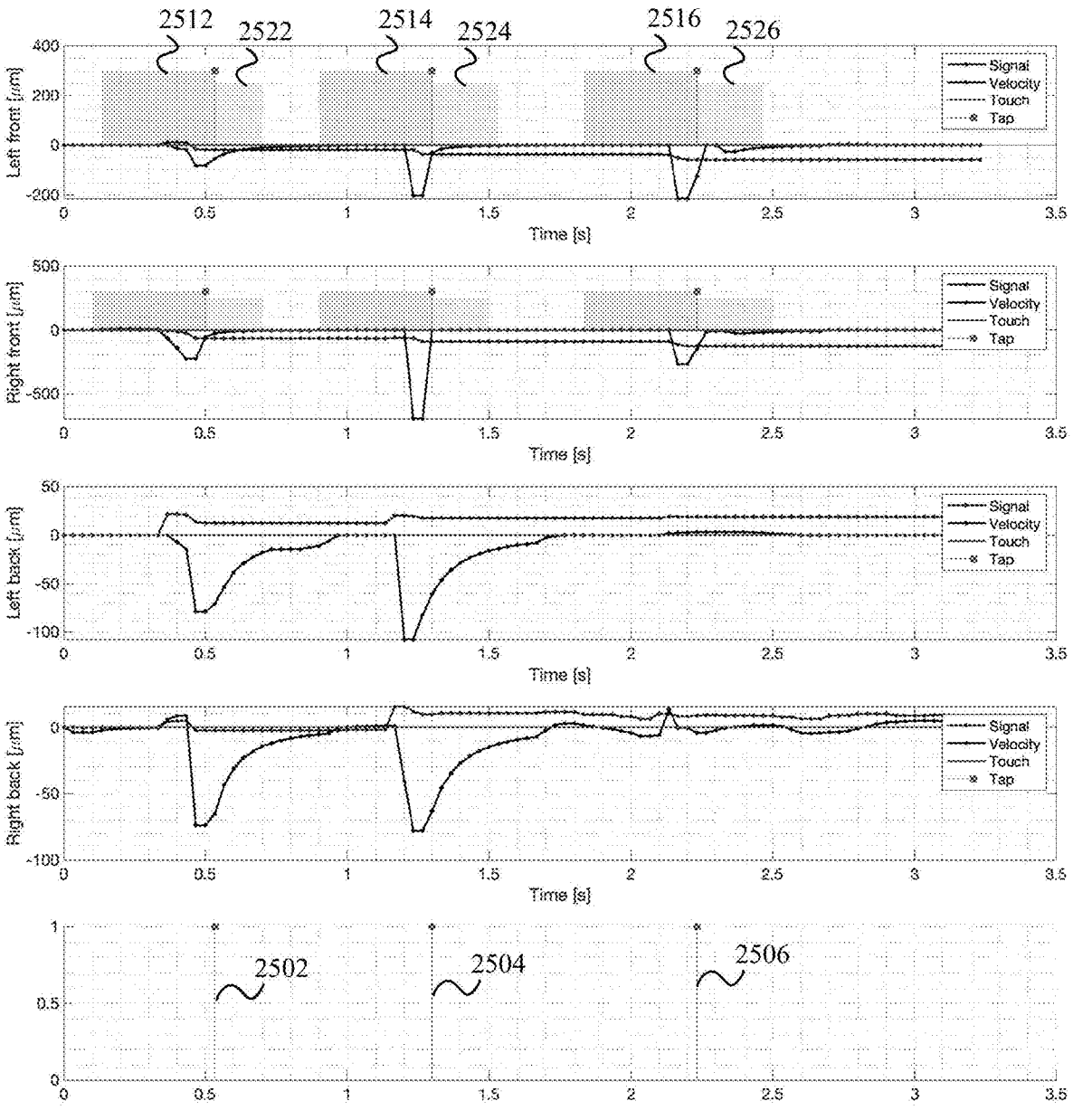

FIGS. 23-25 illustrate touch interaction detection based on a combination of deformation data from four different sensor channels. In FIG. 23, two touch interactions 2302, 2304 are identified based on data from all four sensors. In FIG. 24, two touch interactions are also identified but based primarily on data from two of the four sensors, since the other two sensors are determined to not be providing meaningful data.

FIG. 25 illustrates tap detection based on a combination of deformation data from four different sensor channels. In this example, three taps 2502, 2504, 2506 are detected based on detecting a tap signature over segments of time (e.g., periods 2512, 2514, 2516) in the deformation data. In other words, periods 2512, 2514, 2516 represent how much of the deformation data (i.e., how far back in time) is examined looking for a tap signature. The periods 2522, 2524, 2526 are used to address potential overlapping channel issues two avoid detect slightly offset events detected on different channels as two separate tap events.

Figure 26:
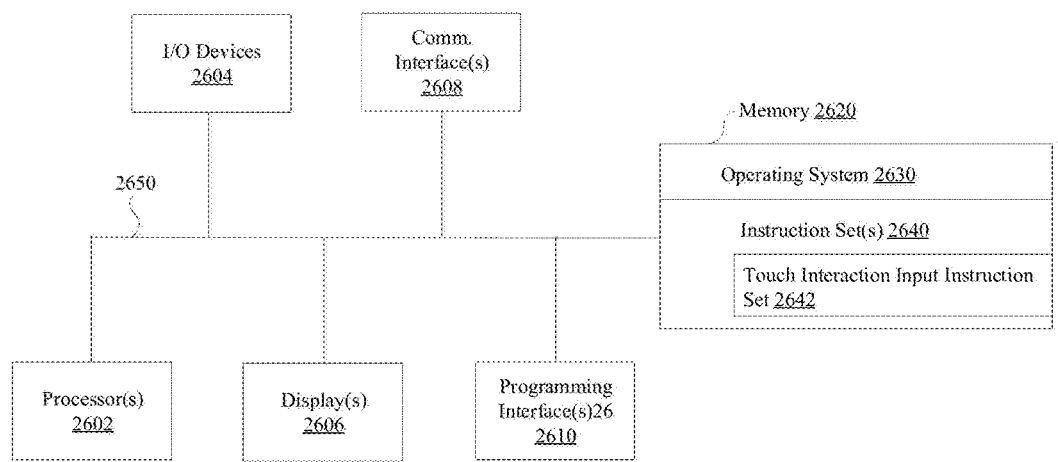
FIG. 26 is a block diagram of an example electronic device that is suitable for some implementations.

FIG. 26 is a block diagram of an example an electronic device 2600 that is suitable for implementing aspects of the present invention. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations first electronic device 2600 includes one or more processors 2602 (e.g., microprocessors, ASICs, FPGAs, GPUs, CPUs, processing cores, or the like), one or more I/O devices 2604, one or more displays 2606, one or more communication interfaces 2608 (e.g., USB, FIRE-WIRE, THUNDERBOLT, IEEE 802.3x, IEEE 802.11x, IEEE 802.16x, GSM, CDMA, TDMA, GPS, IR, BLU-ETOOTH, ZIGBEE, SPI, I2C, or the like type interface), one or more programming (e.g., I/O) interfaces 2610, a memory 2620, and one or more communication buses 2650 for interconnecting these and various other components. In brief, a GPU can include a specialized electronic circuit designed to rapidly manipulate and alter memory to accelerate the creation of images in a frame buffer. A GPU can be present on a video card, or it can be embedded on a motherboard or—in certain CPUs—on the CPU die.

The one or more I/O devices 2604 are configured to provide a human to machine interface exchanging commands, requests, information, data, and the like, between first electronic device 2600 and a user. The one or more I/O devices 2600 can include, but are not limited to, a keyboard, a pointing device, a microphone, a joystick, and the like. In some implementations, the one or more I/O devices 2604 include at least one of an inertial measurement unit ("IMU"), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In one implementation, the one or more I/O devices 2604 comprise an image sensor that is configured to obtain image data depicting a physical environment. Examples of suitable image sensors for effectuating image sensors of the one or more I/O devices 1704 may include one or more RGB camera (e.g., with a complimentary metal-oxide-semiconductor ("CMOS") image sensor or a charge-coupled device ("CCD") image sensor), monochrome camera, IR camera, event-based camera, or the like.

In some implementations, the one or more I/O devices 2604 include a device such as device 130 of FIG. 2 that is configured to detect deformation data of a finger of a user that is used to provide input. The one or more I/O devices 2604 may utilize one or more pliable membranes that make contact with skin of a finger and deform as the skin deforms. The one or more I/O sensors 2604 may utilize LASER interferometry to detect membrane (and thereby skin) deformation and/or an ultrasound to determine a finger shape, thickness, or other characteristics indicative of deformation.

In some implementations, the one or more displays 2606 are configured to present content, as described above, to the user. In some implementations, the one or more displays 2606 correspond to holographic, digital light processing ("DLP"), liquid-crystal display ("LCD"), liquid-crystal on silicon ("LCoS"), organic light-emitting field-effect transitory ("OLET"), organic light-emitting diode ("OLED"), surface-conduction electron-emitter display ("SED"), field-emission display ("FED"), quantum-dot light-emitting diode ("QD-LED"), micro-electro-mechanical system ("MEMS"), or the like display types. In some implementations, the one or more displays 2606 correspond to diffractive, reflective, polarized, holographic, etc. waveguide displays.

In one implementation, the one or more displays 2606 includes a display device comprising a plurality of pixels. Each pixel among the plurality of pixels may be implemented using light-emitting diodes (LEDs), organic light-emitting diodes (OLEDs), plasma cells, liquid crystal display (LCD) components, and the like. In one implementation, the one or more displays 2606 are disposed on an inward facing surface of electronic device 2600. In one implementation, the one or more displays 2606 are a see-through display through which a portion of the physical environment is visible.

In one implementation, the one or more displays 2606 include a stereoscopic image display for presenting left-eye and right-eye viewpoints. In one implementation, the stereoscopic image display presents a stereoscopic subset of a 3D representation of a scene corresponding to a physical environment in which the electronic device 2600 is located. In one implementation, the 3D representation of the scene is reconstructed using light field images captured by an array of image sensors included in the one or more I/O devices 2604.

The one or more communication interfaces 2608 can include any device or group of devices suitable for establishing a wired or wireless data or telephone connection to one or more networks. Non-limiting examples of a network interface device include an Ethernet network adapter, a modem, or the like. A device can transmit messages as electronic or optical signals.

The one or more programming (e.g., I/O) interfaces 2610 are configured to communicatively couple the one or more I/O devices 2604 with other components. As such, the one or more programming interfaces 2610 are capable of accepting commands or input from a user via the one or more I/O devices 2604 and transmitting the entered input to the one or more processors 2602.

The memory 2620 can include any suitable computer-readable medium. A computer readable storage medium should not be construed as transitory signals per se (e.g., radio waves or other propagating electromagnetic waves, electromagnetic waves propagating through a transmission media such as a waveguide, or electrical signals transmitted through a wire). For example, the memory 2620 may include high-speed random-access memory, such as DRAM, SRAM, DDR RAM, or other random-access solid-state memory devices. In some implementations, the memory 2620 includes non-volatile memory, such as one or more magnetic disk storage devices, optical disk storage devices, flash memory devices, or other non-volatile solid-state storage devices. The memory 2620 optionally includes one or more storage devices remotely located from the one or more processing units 2602. The memory 2620 comprises a non-transitory computer readable storage medium. Instructions stored in the memory 2620 may be executed by the one or more processors 2602 to perform a variety of methods and operations, including the techniques described in greater detail herein.

In some implementations, the memory 2620 or the non-transitory computer readable storage medium of the memory 2620 stores an optional operating system 2630 and one or more instruction set(s) 2640. The operating system 2630 includes procedures for handling various basic system services and for performing hardware dependent tasks. In some implementations, the instruction set(s) include executable software defined by binary information stored in the form of electrical charge. In some implementations, the instruction set(s) include and/or utilize logic, heuristics, machine learning models, stored data, and/or metadata. In some implementations, the instruction set(s) are software that is executable by the one or more processing units 2602 to carry out one or more of the techniques described herein.

In some implementations, the instruction set(s) 1740 are configured to manage and coordinate one or more environments (e.g., CGR environments) for one or more users (e.g., a single CGR environment for one or more users, or multiple CGR environments for respective groups of one or more users). To that end, in various implementations, the environment instruction set(s) 1740 include a touch interaction instruction set 2642. In some implementations, the touch interaction instruction set 2642 is executable by the processing unit(s) 2602 to obtain data (e.g., sensor data) and determine touch interactions based on the data, for example, according to one or more of the techniques disclosed herein. The obtained data may be obtained from sensors or other components of electronic device 2600 or from one or more external electronic devices.

FIG. 26 is intended more as functional description of the various features which are present in a particular implementation as opposed to a structural schematic of the implementations described herein. As recognized by those of ordinary skill in the art, items shown separately could be combined and some items could be separated. For example, although the instruction sets are shown as residing on a single device, it should be understood that in other implementations, any combination of the instruction sets may be located in separate computing devices. The actual number of instruction sets and the division of particular functions and how features are allocated among them will vary from one implementation to another and, in some implementations, depends in part on the particular combination of hardware, software, or firmware chosen for a particular implementation.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, without changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "or" as used herein refers to and encompasses any and all possible combinations of one or more of the associated listed items. It will be further understood that the terms "comprises" or "comprising," when used in this specification, specify the presence of stated features, integers, steps, operations, elements, or components, but do not preclude the presence or addition of one or more other features, integers, steps, operations, elements, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:

at a processor:

obtaining a plurality of channels of deformation data from a plurality of sensors on a device, wherein the sensors are positioned adjacent to a plurality of portions of a finger to detect an amount of change in position of portions of skin corresponding deformations of the plurality of portions of the finger over time;

detecting events based on the deformation data, wherein the events are detected by analyzing time segments of data from the plurality of channels and identifying characteristics of the time segments to distinguish different types of touch interactions, wherein detecting the events comprising:

detecting a first event during which the finger makes contact with a surface by detecting when the finger changes from a first state of not being in contact with the surface to a second state of being in contact with the surface; and detecting a second event, following the first event, during which the finger breaks the contact with the surface by detecting when the finger changes from the second state of being in contact with the surface back to the first state of not being in contact with the surface; and identifying a touch interaction based on the detected events, wherein identifying the touch interaction comprises identifying a type of the touch interaction and is based on analyzing the plurality of channels of the deformation data, wherein the characteristics are used to identify the type of the touch interaction, identify the duration of the touch interaction, and identify an amount of movement associated with the touch interaction.

2. The method of claim 1, wherein detecting the events is based on an estimation of displacement of the finger.

3. The method of claim 1, wherein detecting the events is based on at least four measures of displacements of the finger based on at least four deformation sensors.

4. The method of claim 1, wherein detecting the events based on the estimation of displacement of the finger comprises accounting for a baseline displacement of the finger.

5. The method of claim 1, wherein detecting the events is based on an estimation of velocity of the displacement.

6. The method of claim 1 further comprising determining a measurement of a physical interaction of the finger based on the deformation data, wherein the touch interaction is identified based on the measurement.

7. The method of claim 6, wherein the measurement comprises a force, direction, or shear.

8. The method of claim 1, wherein identifying the touch interaction comprises identifying a touch stage state.

9. The method of claim 1, wherein identifying the touch interaction comprises identifying that a type of the touch interaction is:

a pinch of the finger against another finger;

a tap of the finger on a surface; or a swipe of the finger on the surface.

10. The method of claim 9, wherein identifying the type of the touch interaction comprises identifying whether the pinch is a long pinch or quick pinch based on a time threshold.

11. The method of claim 9, wherein identifying the type of the touch interaction comprises identifying whether the touch interaction is a single tap or a double tap based on a time threshold.

12. A system comprising:

a non-transitory computer-readable storage medium; and one or more processors coupled to the non-transitory computer-readable storage medium, wherein the non-transitory computer-readable storage medium comprises program instructions that, when executed on the one or more processors, cause the system to perform operations comprising:

obtaining a plurality of channels of deformation data from a plurality of sensors on a device, wherein the sensors are positioned adjacent to a plurality of portions of a finger to detect an amount of change in position of portions of skin corresponding to deformations of the plurality of portions of the finger, wherein the deformation data comprises time-based data corresponding to detecting the deformations of the plurality of portions of the finger over time;

detecting events based on the deformation data, wherein the events are detected by analyzing time segments of data from the plurality of channels and identifying characteristics of the time segments to distinguish different types of touch interactions, wherein detecting the events comprising:

detecting a first event during which the finger makes contact with a surface by detecting when the finger changes from a first state of not being in contact with the surface to a second state of being in contact with the surface; and detecting a second event, following the first event, during which the finger breaks the contact with the surface by detecting when the finger changes from the second state of being in contact with the surface back to the first state of not being in contact with the surface; and identifying a touch interaction based on the detected events, wherein identifying the touch interaction comprises identifying a type of the touch interaction and is based on analyzing the plurality of channels of the deformation data, wherein the characteristics are used to identify the type of the touch interaction, identify the duration of the touch interaction, and identify an amount of movement associated with the touch interaction.

13. The system of claim 12, wherein detecting the events is based on an estimation of displacement of the finger and a rate of displacement.

14. The system of claim 12, wherein detecting the events is based on at least four measures of displacements of the finger based on at least four deformation sensors.

15. The system of claim 13, wherein the operations further comprise determining a measurement of a physical interaction of the finger based on the deformation data, wherein the touch interaction is identified based on the measurement.

16. A non-transitory computer-readable storage medium, storing program instructions executable by one or more processors to perform operations comprising:

obtaining a plurality of channels of deformation data from a plurality of sensors on a device, wherein the sensors are positioned adjacent to a plurality of portions of a finger to detect an amount of change in position of portions of skin corresponding to deformations of the plurality of portions of the finger, wherein the deformation data comprises time-based data corresponding to detecting the deformations of the plurality of portions of the finger over time;

detecting events based on the deformation data, wherein the events are detected by analyzing time segments of data from the plurality of channels and identifying characteristics of the time segments to distinguish different types of touch interactions, wherein detecting the events comprising:

detecting a first event during which the finger makes contact with a surface by detecting when the finger changes from a first state of not being in contact with the surface to a second state of being in contact with the surface; and detecting a second event, following the first event, during which the finger breaks the contact with the surface by detecting when the finger changes from the second state of being in contact with the surface back to the first state of not being in contact with the surface; and identifying a touch interaction based on the detected events, wherein identifying the touch interaction comprises identifying a type of the touch interaction and is based on analyzing the plurality of channels of the deformation data, wherein the characteristics are used to identify the type of the touch interaction, identify the duration of the touch interaction, and identify an amount of movement associated with the touch interaction.

17. The non-transitory computer-readable storage medium of claim 16, wherein detecting the events is based on an estimation of displacement of the finger and a rate of displacement.

18. The non-transitory computer-readable storage medium of claim 16, wherein the operations further comprise determining a measurement of a physical interaction of the finger based on the deformation data, wherein the touch interaction is identified based on the measurement.

* * * * *